US006926807B2

(12) United States Patent
Bosi et al.

(10) Patent No.: US 6,926,807 B2
(45) Date of Patent: Aug. 9, 2005

(54) INSULATED TRANSITION SPOOL APPARATUS

(75) Inventors: David M. Bosi, Napa, CA (US); David W. Reeves, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 236 days.

(21) Appl. No.: 10/461,257

(22) Filed: Jun. 12, 2003

(65) Prior Publication Data

US 2004/0251121 A1 Dec. 16, 2004

(51) Int. Cl.[7] .............................. B01D 3/14; C10B 1/00

(52) U.S. Cl. ....................... 202/162; 202/222; 202/239; 202/242; 202/245; 202/250; 202/246; 202/252; 202/254; 202/270; 285/31; 285/47; 285/53; 285/55; 285/284.1; 285/332; 285/333; 285/405; 285/121; 285/222; 285/239; 285/242; 285/245; 285/246; 285/250; 285/252; 285/254; 285/270

(58) Field of Search ............................. 285/31, 47, 53, 285/55, 284.1, 332, 333, 334.5, 397, 405, 121; 202/222, 239, 242, 245, 246, 250, 252, 254, 270

(56) References Cited

U.S. PATENT DOCUMENTS 4,726,109 A 2/1988 Malsbury et al.
4,750,763 A * 6/1988 Bechu et al. ............... 285/229
4,852,917 A * 8/1989 Viall, Jr. ..................... 285/353
5,098,524 A 3/1992 Antalfy et al.
5,221,019 A 6/1993 Pechacek et al.
5,228,825 A 7/1993 Fruchtbaum et al.
5,290,072 A * 3/1994 Pechacek ..................... 285/97
5,492,373 A * 2/1996 Smith .................... 285/148.19
5,500,094 A 3/1996 Fruchtbaum et al.
5,581,864 A 12/1996 Rabet
5,785,843 A 7/1998 Antalffy et al.
5,813,706 A * 9/1998 Travis ........................ 285/363
5,876,568 A 3/1999 Kindersley
5,947,674 A 9/1999 Malsbury et al.
6,066,237 A 5/2000 Kindersley
6,254,733 B1 7/2001 Lu et al.
6,264,829 B1 7/2001 Antalffy et al.
6,660,131 B2 * 12/2003 Lah ........................... 202/245

FOREIGN PATENT DOCUMENTS

WO WO 02/07371 1/2002

OTHER PUBLICATIONS

Robert V. Bell et al., U.S. Appl. No. 10/043,527, Safe and Automatic Method for Removal of Coke from a Coke Vessel, filed Jan. 10, 2002.

* cited by examiner

*Primary Examiner*—Glenn Caldarola
*Assistant Examiner*—Alexis Wachtel
(74) *Attorney, Agent, or Firm*—Steven R. Ellinwood; Alan W. Klaassen

(57) ABSTRACT

An insulated transition spool apparatus for mounting unheading devices to pressure vessels, such as coker vessels, and enabling repetitive operation thereof is disclosed. The apparatus comprises an outer housing, an inner housing that encloses an insulating space between the inner and outer housing, a side feed entry aperture in each housing and a spool adapter flange to facilitate attachment of the spool to the vessel.

24 Claims, 6 Drawing Sheets

INSULATED TRANSITION SPOOL APPARATUS

FIELD OF THE INVENTION

This invention relates to the field of pressure vessels, such as pressure vessels used in heavy hydrocarbon coking processes, and apparatus for joining vessel components.

BACKGROUND OF THE INVENTION

Pressure vessel innovation, especially in the petroleum refining industry, is driven by the factors of utility, safety, reliability, costs and ease of operation and maintenance. This is especially true in the petroleum refining process of delayed coking in which large pressure vessels are employed to recover valuable products by thermally cracking heavy residual hydrocarbons. Heavy residual hydrocarbon, or resid, is the recovered bottom stream from the initial refining of crude oil or other oil sources such as shale oil, coal oil, or Fischer Tropsch synthetic oil.

Generally, the delayed coking process involves heating the heavy hydrocarbon feed from a fractionation unit, and then pumping the heated heavy feed into a large steel pressure vessel commonly known as a coke drum. The unvaporized portion of the heated heavy feed settles out in the coke drum where the combined effect of retention time and temperature causes the formation of coke. Vapors from the top of the coke drum, which typically consist of steam, gas, naphtha and gas oils, are returned to the base of the fractionation unit for further processing into desired light hydrocarbon products. The operating conditions of delayed coking can be quite severe. Normal operating pressures in coke vessels typically range from 25 to about 50 pounds per square inch and the heavy feed inlet temperature may vary between 800° F. and 1000° F.

Coke vessels are typically large, cylindrical vessels commonly 19 to 30 feet in diameter and two to three times as tall having a top head and a funnel shaped bottom portion fitted with a bottom head and are usually present in pairs so that they can be operated alternately. Coke settles out and accumulates in the vessel until it is filled to a safe margin, at which time the heated feed is switched to the empty "sister" coke vessel. Thus, while one coke vessel is being filled with heated residual oil, the other vessel is being cooled and purged of hundreds to thousands of tons of coke formed in the vessel during the previous recovery cycle.

Removal of coke from a full coker vessel, also known as decoking, typically is a time consuming and potentially dangerous process that generally involves cooling the multi-ton coke mass with water, drilling and cutting the coke mass from the drum with a specialized drilling system and dumping the hot, disaggregated mass along with steam and hot water into a chute through a hole in the coke vessel bottom. Opening the hole in the coker vessel bottom (or the top hole for drill insertion) for coke removal in older systems involves removal of a head device, which is designed to tightly seal the coker vessel during the coking phase of the cycle. The process of removing and replacing the removable top head and bottom units of the vessel cover is called heading and unheading or deheading. It is dangerous work, with several risks associated with the procedures. There have been fatalities and many serious injuries. There is significant safety risk from exposure to steam, hot water, fires and repetitive stress associated with the manual unbolting work. Accordingly, the industry has devoted substantial time and investment in developing semi-automatic or fully automatic unheading systems, with attention focused on bottom unheading where the greatest safety hazard is present.

There are two commonly used methods to move the bottom head out of the way of the falling coke. The first is to completely remove the head from the vessel, perhaps carrying it away from the vessel on a cart. The other way of "removing" the bottom head is to swing it out of the way, as on a hinge or pivot, while the head is still coupled to the vessel. These systems all use a manual or semi-automatic bolting system that must be uncoupled with every decoking cycle and require that a pressure tight and leak free seal is re-established before the coking cycle can begin. Several coker vessel systems of the above described types are disclosed in: U.S. Pat. No. 6,264,829 (discloses a swing away hydraulically operated drumhead adapted for low headroom situations); U.S. Pat. No. 6,254,733 (depicting in the drawings a hydraulically removable drumhead); U.S. Pat. Nos. 6,066,237 and 5,876,568 (disclosing an apparatus for semi-automatically clamping and unclamping a drum bottom head); U.S. Pat. No. 5,947,674 (a drum head device removed by vertically oriented hydraulic cylinders adapted for lowering the head unit and moving it laterally aside); U.S. Pat. No. 5,785,843 (claims a process involving a swing away hydraulically operated drumhead adapted for low headroom situations); U.S. Pat. No. 5,581,864 (a remotely operated carriage mounted drumhead removal system); U.S. Pat. No. 5,500,094 (car mounted drumhead removal system that is horizontally movable); U.S. Pat. No. 5,228,825 (a device and method for deheading a drum comprising, in part, a cradle that holds the drum head for removal); U.S. Pat. No. 5,221,019 (a remotely operated cart removal system); U.S. Pat. No. 5,098,524 (a pivotally attached unheading device associated with clamps); U.S. Pat. No. 4,726,109 (a platform device lowers the drumhead and moves it laterally away).

All the above described bottom head removal systems pipe the heated feed into the coke vessel from the bottom through the center of the bottom head. Reorienting the bottom feed to the side above the unheading devices would eliminate many of the time consuming and unsafe tasks associated with unheading coker vessels and such systems are known in the older art. However, side entry use has been discontinued in coker vessels built and put into operation in the last 20 to 30 or more years because of significant problems maintaining the integrity of the seals between the head devices and the vessel resulting in significant leakage events and maintenance downtime. It is well known in the art that side entry feed systems result in differential thermal and weight loads at the flanged interfaces between the head devices and the vessels. These conditions create significant challenges for seal maintenance, thus there is a preference in the art for bottom entry feed systems, which makes decoking safety and efficiency improvements difficult. Recently, however, significant improvements in the process of opening and closing pressure vessels, such as coker vessels have been achieved; for example, the "unheading" valve described in PCT Patent WO 02/07371. This new valve easily and automatically opens and closes a coker drum and is repetitively operable through numerous coking/decoking cycles, thus eliminating the cyclic heading and deheading process as described above. However, to be repetitively and continuously operable through numerous coking/decoking cycles without removal, this type of valve closure requires a feed entry system laterally placed above the valve apparatus. Such a system is disclosed in U.S. patent application Ser. No. 10/043,527 which teaches a closed system that eliminates worker exposure during coker vessel decoking operations and increases coking capacity by reducing the coking cycle time. In one preferred embodiment that is particularly useful for retrofitting existing coker systems, a bottom adapter or transition piece, herein termed a spool, is interposed between the vessel bottom and the valve closure unit and pressure-tightly sealed to both. In this system, the side entry feed is most readily accomplished by means of a feed pipeline laterally attached to the adapting spool member. The spool member comprises a single, cylindrical unit with annular flanged surfaces on both ends for attachment between the coker vessel and the valve apparatus. However, even with improvements in flange and seal design over older systems, maintaining seal integrity at the spool/vessel and spool/valve interfaces continues to be a significant problem as a result of the differential thermal and weight loads attendant to the side entry feed configuration. Such differential loads result from asymmetrical coke accumulation and distribution on the lower portion of the coker drum, which causes high flange loads and high temperatures to be concentrated leading to flange stud yielding, chronic flange leaks and ultimately metal fatigue. Further exacerbating the problem are delayed coking process operating temperatures that range from ambient to about 1000° F., which causes uneven expansion and contraction of the spool and vessel flange diameters by as much as $1/8^{th}$ inch every coking/decoking cycle. Such differential expansion between the drum and spool flange causes gasket failure. The present invention, directed to an insulated transition spool apparatus, solves these problems.

SUMMARY OF THE INVENTION

The present invention is directed to an insulated transition spool, which allows for pressure-tight attachment of unheading devices or other types of devices to vessels, such as coker vessels, when it is important to maintain pressure-tight seals through many operational cycles. In the pressure vessels used in delayed coking, operating temperatures cycle between low to high temperatures in a short period of time. Typical coking and decoking times range from 12 to 30 hours for each complete cycle and temperatures can range from ambient to as high as 1000° F. within this time frame. Additionally, static load pressures on flanged joints and seals at the vessel bottom can range from 10,000 psi to over a 1,000,000 psi. These cyclic variations in temperature and static load pressures typically necessitate replacement of gaskets at each of the flanged connections with undesirable frequency.

Accordingly, an insulated transition spool apparatus is provided for joining and pressure-tightly sealing a coker vessel to another device, such as an unheading device, wherein the spool comprises: (a) An outer housing having a central bore along a vertical axis, a first flanged end, a second flanged end and a first lateral aperture; (b) an inner housing having a central bore along a vertical axis, at least one flanged end and a second lateral aperture, wherein the inner housing is movably seated within the central bore of the outer housing, enclosing a thermal barrier; and the first lateral aperture and the second lateral aperture are axially aligned and, (c) a spool adapter flange joined to the first flanged end of the outer housing and moveably seated on the at least one flanged end of the inner housing. In a peferred embodiment of the invention a double rail gasket is pressure tightly placed between the flanged end of a coker vessel and the flanged end of the assembled spool apparatus. In one embodiment of the invention he spool adapter flange is permanently attached to the bottom of the coke vessel and provides a shear plane that limits the ability of the drum to extrude coke into the spool. In a preferred embodiment of the invention the spool apparatus is attached to a coker drum and a coking valve as described in U.S. patent application Ser. No. 10/043527.

DETAILED DESCRIPTION OF THE INVENTION

Figure 1:
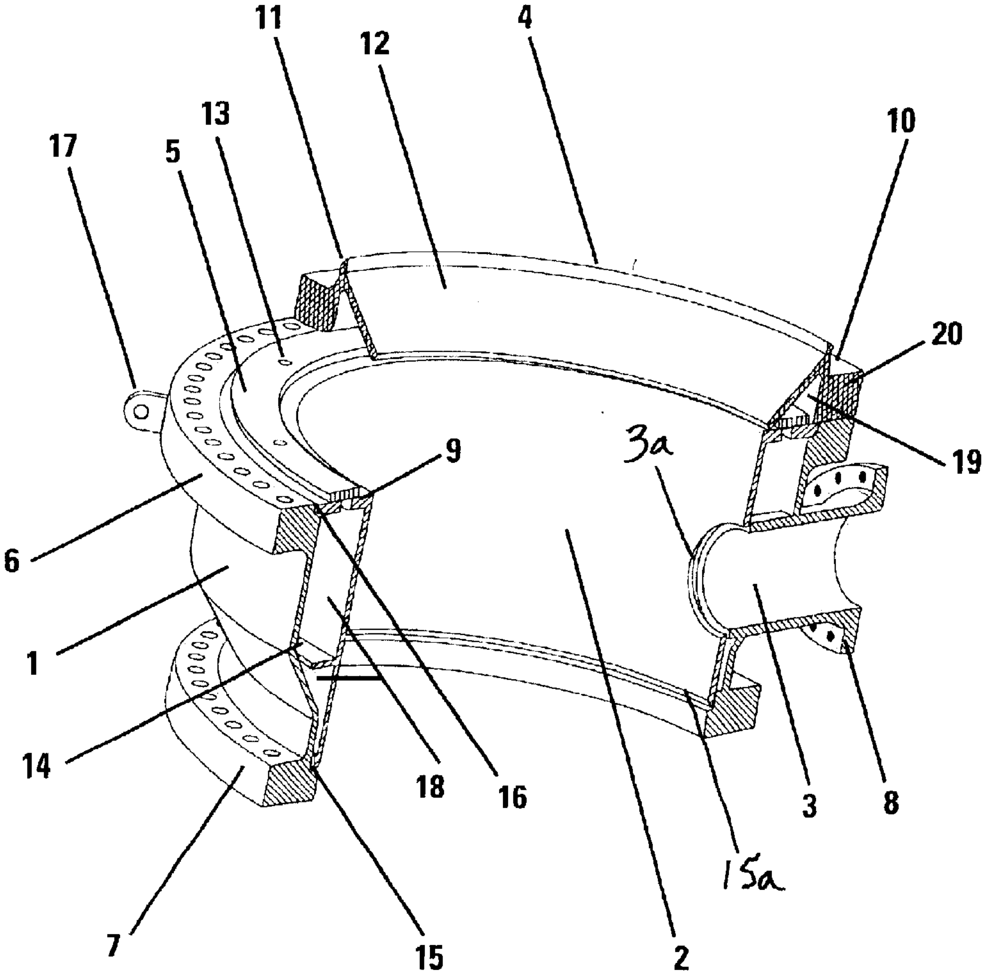
FIG. 1 is a top, cut-a-way view of the insulated transition spool and the flange adapter.
Figure 4:
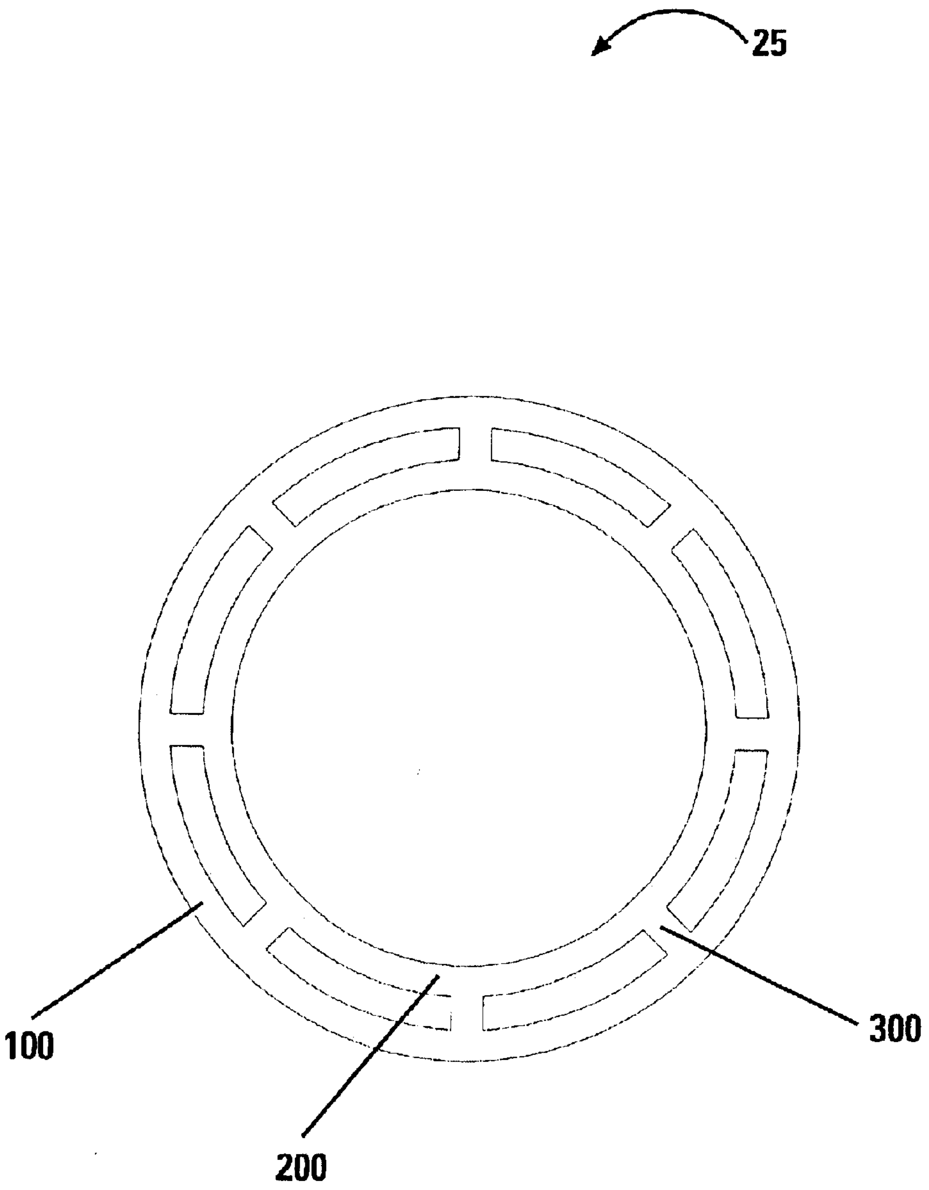
FIG. 4 is a top view of a double rail gasket.

As shown in FIG. 1, the insulated transition spool comprises three major elements: (1) an outer housing 1 having a central bore along a vertical axis, a first flanged end 6, a second flanged end 7 and a first lateral aperture 3; a first registration area 15, a second registration area 16; (2) an inner housing 2, which is a straight walled "barrel" component having a central bore, a registration flange 9, a registration end 15*a* and a second lateral aperture 3*a*; and (3) a spool adapter flange 4 comprising and outer flange 20, and inner surface 12 and a support ring 5 having a plurality of vent holes 13 therein and enclosing a thermal barrier 19. These three elements are joined together such that the inner housing 2 is movably seated within the central bore of the outer housing 1 by contacting the registration flange 9 with the second registration area 16 and the registration end 15*a* with the first registration area to enclose a thermal barrier or insulating space 18; the first lateral aperture 3 of the outer housing 1 and the second lateral aperture 3*a* of the inner housing 2 are axially aligned and; the spool adapter flange 12 is pressure tightly joined to the first flanged end 6 of the outer housing 1 and is moveably seated on the registration flange 9 of the inner housing. In a preferred embodiment of the invention the first lateral aperture 3 of the outer housing 1 comprises a tube having an exterior flanged end 8 for pressure-tight attachment to a feed pipe and an interior end protruding through the second thermal barrier into flush, circumferential contact with the second lateral aperture 3*a*. In another preferred embodiment the double rail gasket 25 of FIG. 4 is placed between the spool adapter 12, the first flanged end of the outer housing 6 and the registration flange of the inner housing 9 to effect a pressure tight seal.

Dimensions of the insulated transition spool will vary depending on the pressure vessel size, and openings thereof, to which the spool is mounted and the size and opening diameters of deheading valves or other devices selected for attachment to said pressure vessels by means of the transition spool. The inside diameter of first flanged end 6 the outer housing 1 ranges from about 48 to 72 inches, preferably from about 60 to 72 inches and most preferably about 60 inches. The inside diameter of the second flanged end 7 of the outer housing 1 ranges from about 72 to 48 inches, preferably about 48 to 60 and most preferably about 48 inches.

Figure 2:
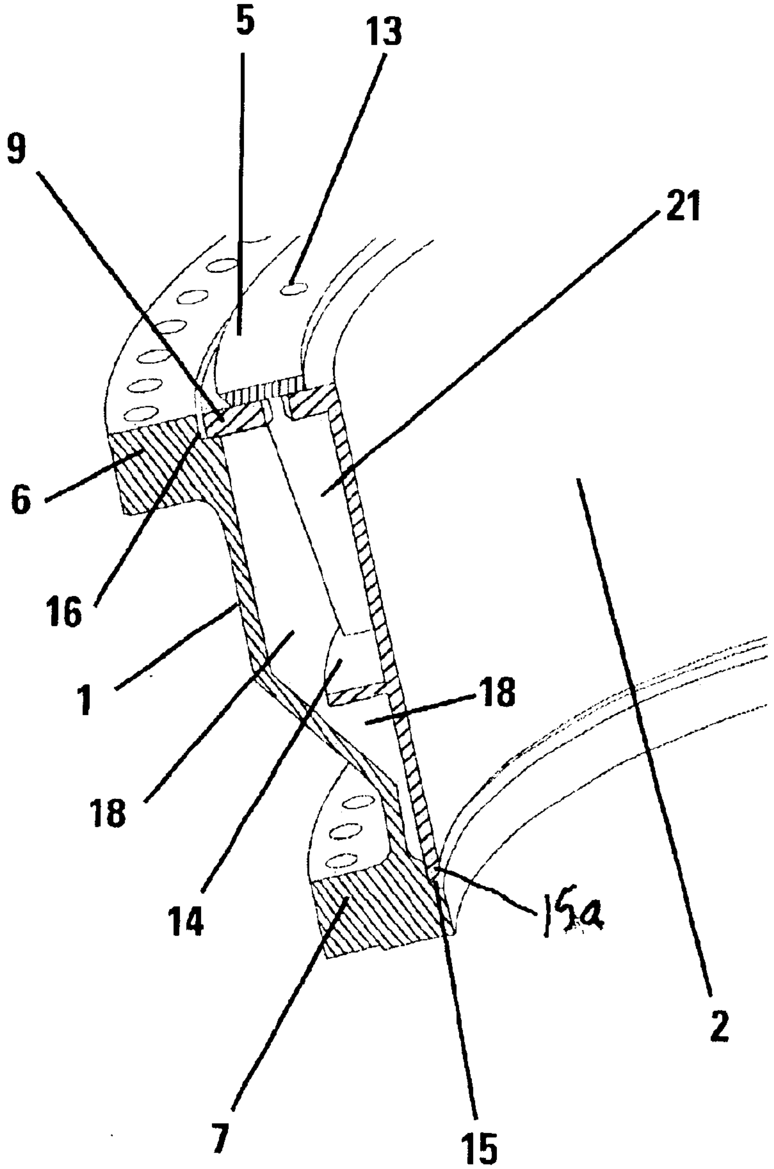
FIG. 2 is a close up, cut-a-way view depicting the nesting or registration of the thermal transition spool components.
Figure 3:
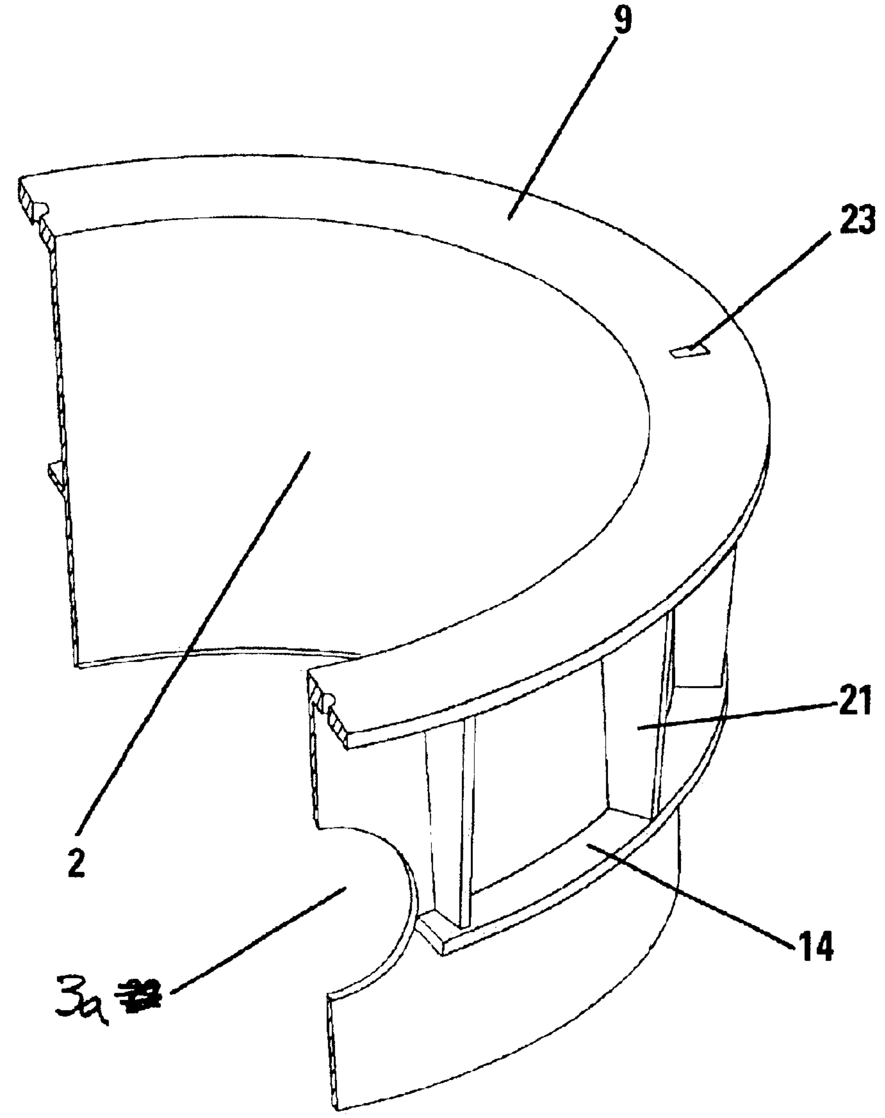
FIG. 3 is a cut-a-way view showing the inner housing of the insulated transition spool.

As depicted in FIGS. 1 and 2, when the inner housing 2 is inserted into the outer housing 1 an annular space 18 is formed between the outer wall of the inner housing 2 and the inner wall of the outer housing 1 which functions as a thermal barrier or insulating space. The insulating space 18 is sectioned into many spaces by evenly spaced vertical support elements 21 and a horizontal support element 14. Attachment of these support elements can be either on the inner wall of the outer housing 1 or on the outer wall of the inner housing 2. The preferred mode of attachment is to attach the support elements to the outer wall of the inner housing 2 as represented in FIG. 3. The insulating space 18 can be optionally filled with a commercially available thermal insulating product, such as a refractory material, to create an improved or more efficient thermal barrier. This insulating space 18 isolates the outer housing 1 or "spool" from the hot inlet feed stream and cracking temperatures that typically range between 800° F. and 1000° F. to temperatures that more typically range between 200° F. and 600° F. Insulating the outer housing from such temperature extremes significantly reduces the degree of expansion and contraction and resulting distortion that flanges exhibit in uninsulated devices. Reduction of such expansion, contraction and distortion significantly reduces stress and loading on flange bolting, clamping or other joining systems, including gaskets; thus, minimizing or even eliminating flange leaks and improving safety, environmental performance and reducing downtime for major maintenance. In addition to insulating the outer housing 1 from coking temperature extremes the inner housing 2 provides vertical walls that inhibit or eliminate the weight and pressure loads the accumulated coke mass exerts on the conical or angled walls of conventional spools. This feature similarly reduces stress and loading on flange bolting, clamping or other joining systems, including the gaskets, with the attendant benefits discussed above.

Referring again to FIG. 1 and FIG. 5, the transition spool apparatus further comprises a spool adapter flange 4 comprising an outer flange 20, a beveled top edge 11, a beveled or angled, annular inner surface 12 and a support ring 5 having a plurality of vent holes therein 13 and enclosing a thermal barrier 19. The spool adapter flange 4 is used to connect the transition spool assembly to a pressure vessel, such as a coker drum and is joined to the vessel at its beveled edge 11, such as by welding or other suitable means of pressure-tight, leak proof attachment. The outer flange 20 is designed and sized to concentrically mate to the upper flange 6 of the transition spool assembly. In a preferred embodiment, the thermal barrier 19 is filled with a commercially available insulating material to create an improved, more efficient thermal barrier. The beveled inner surface 12 of the spool adapter flange 4 has an angle in the range of 30° to 60° relative to the vertical axis of the central bore. The preferred angle of the beveled inner surface is 45°. The beveled inner surface 12 protects the spool internal components from coke impacts during the coke removal phase of the coking operation. Additionally, when the bottom deheading valve is first opened the beveled surface 12 of the spool adapter flange 4 acts to initially shear the solid mass of the coke contained within the drum. This results since the brittle coke cannot flow past the beveled spool adapter flange without first fracturing. Additionally, the beveled spool adapter flange limits the otherwise significant coke extrusion loads that a drum transfers to the angled sides of a conventional spool.

Figure 5:
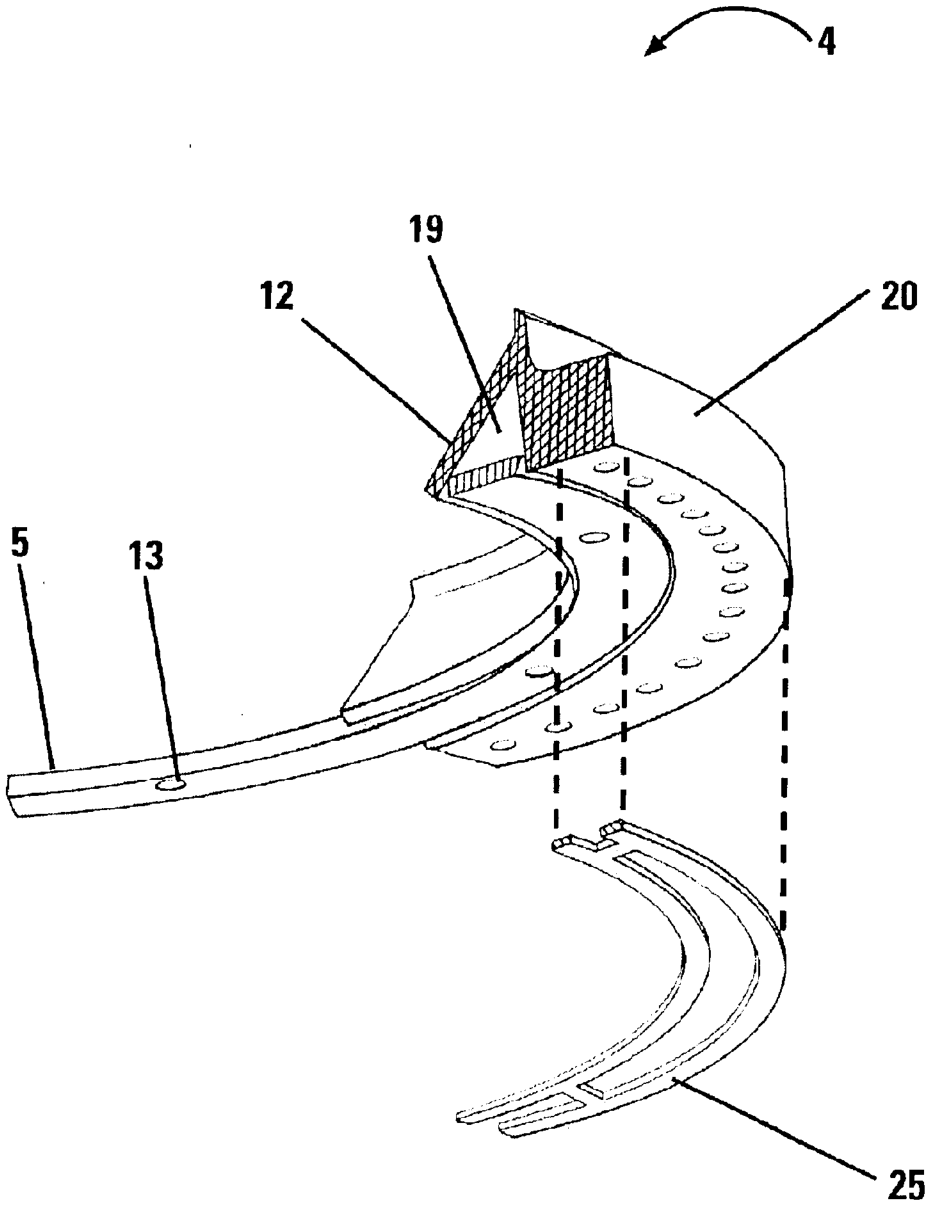
FIG. 5 is a bottom, cut-a-way portion view of the flange adapter depicting the placement of the double rail gasket.

FIG. 4 presents a special double rail gasket 25, which is used to seal the insulated transition spool apparatus to the spool adapter flange 4. FIG. 4 depicts a top view of the double rail gasket showing concentric outer 100 and inner rings 200 and having a plurality of spoke-like cross members 300 connecting the outer ring to the inner ring. The double rail gasket is placed between spool flange 20 of the spool adapter flange 4 and flange 6 of the outer housing 1 as shown in FIG. 5. The gasket further comprises a metal core, such as stainless steel, and a flexible material suitable for use as a gasket in combination with metal under temperatures ranging from −50° F. to 1000° F. and pressures ranging from 100 psi to 200 psi. In a preferred embodiment of the present invention the metal double rail gasket comprises stainless steel ranging in thickness from about 0.020 inches to 0.140 inches, preferably about 0.024 inches to about 0.035 inches and most preferably from about 0.028 inches to about 0.032 inches, and is concentrically corrugated. Said corrugations range in height above the metal surface of the gasket from a minimum of about 0.001 inches to a maximum of about 0.050 inches, preferably from a minimum of about 0.005 inches to a maximum of about 0.030 inches and most preferably from a minimum of about 0.010 inches to a maximum of about 0.020 inches. Once corrugated, the width of the gasket is such that the outside and inside diameters thereof are respectively coincident with the outside and inside diameter of the flanged surfaces of the spool adapter flange, the outer housing, and the pressure vessel attachment, for example, a coker valve or closure unit. Flexible graphite material, such as Polycarbon® flexible graphite Grade B or BP (with antioxidant inhibitor) or Union Carbide flexible graphite grade GTB or GTK (with antioxidant inhibitor), is bonded to the upper and lower surfaces of the gasket metal core such that the gasket is sandwiched between the layers of graphite material. In a preferred embodiment of the invention, the gasket spokes, which are not typically covered with such graphite material, enable accurate spacing of ring 100 and ring 200 and tangential placement, respectively, on the inside and outside edges of flange bolt holes as depicted in FIG. 5. Thickness of the graphite material can range from about 0.005 inches to about 0.030 inches, preferably between 0.010 inches to about 0.025 inches and most preferably is about 0.015 to about 0.020 inches thick. Preferably the graphite covering will have the same nominal inside and outside diameter dimensions of the metal gasket. Upon bonding to the gasket metal core surfaces, the corrugations thereof should be covered by the graphite material. The lower gasket below flange 7 will be a typical corrugated metal gasket well known to one skilled in the art.

All the flanged surfaces are preferably prepared for joining, gasket placement and sealing by first machining the flange surfaces to an RMS (root mean squared) finish ranging from 50 to 400, preferably 100 to 300 and most preferably between about 120 to 130. After gasket placement, flanges 6 and 20 are pressure-tightly joined together by a plurality of suitable fasteners, such as bolts, clamps or similar means. The fastening means, such as bolts, clamps or similar means are tightened or torqued such that the pressure placed on the double rail gasket ranges between 10,000 psi to 40,000 psi, preferably between 15,000 and 25,000 psi and most preferably 20,000 psi. Preferably, said torque pressure is applied evenly around the gasket circumference. Flange 7 is concentrically joined by similar means to the flanged aperture of a vessel deheading device, such as the valve deheading apparatus mentioned above. Sealing the flanged surfaces of the spool adapter flange, the outer housing, and a coker attachment; for example, a coker valve or closure unit in the manner described above, results in pressure-tight seals that tolerate the differential expansion that occurs between the flanges during the repetitive coking/decoking cycles of the present invention.

Figure 6:
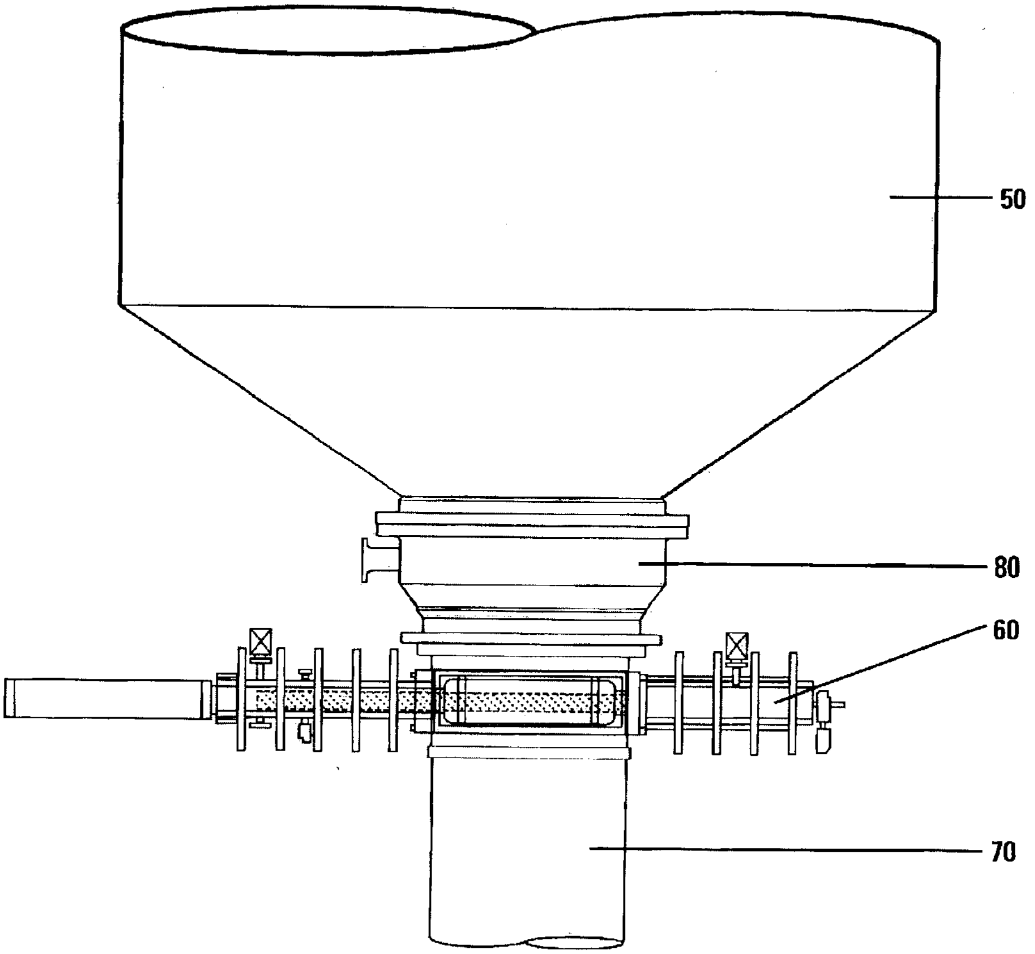
FIG. 6 is a side view of the insulated transition spool apparatus attached to a coker drum and a coker deheading valve with chute.

FIG. 6, represents a typical coker drum installation using the insulated transition spool apparatus of this invention in connection with a valve deheading apparatus. The transition spool apparatus 80 is shown attached to a coker drum 50 on one end of the spool and a coker valve 60 and chute 70 on the opposite end of the spool.

Although the present invention is described in relation to particular embodiments thereof, many other variations and modifications and other uses will become apparent to those skilled in the art. Therefore, the present invention should be limited only by the appended claims and not by the specific disclosure herein.

What is claimed is:

1. A spool apparatus comprising:

(a) an outer housing having a central bore along a vertical axis, a first flanged end, a second flanged end and a first lateral aperture;

(b) an inner housing having a central bore along a vertical axis, at least one flanged surface and a second lateral aperture, wherein the inner housing is movably seated within the central bore of the outer housing, enclosing a thermal barrier and the second lateral aperture is axially aligned with the first lateral aperture of the outer housing; and (c) a spool adapter flange joined to the first flanged end of the outer housing and moveably seated on the at least one flanged surface of the inner housing.

2. The spool assembly of claim 1 wherein the thermal barrier defines an annular space between the inner housing and the outer housing.

3. The spool assembly of claim 1 wherein the thermal barrier comprises a plurality of spaces separated by support elements.

4. The spool assembly of claim 3 wherein said support elements are attached to the outer surface of the inner housing and comprise a horizontal member and a plurality of evenly spaced vertical members.

5. The spool assembly of claim 3 wherein said support elements are attached to the inner surface of the outer housing and comprise a plurality of evenly spaced vertical members.

6. The spool assembly of claim 1 wherein the thermal barrier comprises an insulating material.

7. The spool assembly of claim 1 wherein the outer housing comprises a first registration area and a second registration area.

8. The spool assembly of claim 7 wherein the inner housing is moveably seated on the first registration area and the second registration area.

9. The spool assembly of claim 1 wherein the central bore of the outer housing defines an annular space.

10. The spool assembly of claim 1 wherein the central bore of the inner housing defines an annular space.

11. The spool assembly of claim 1 wherein the inner housing comprises a registration flange and a registration end.

12. The spool assembly of claim 1 wherein the spool flange adapter comprises an interior surface, a flanged outer surface, and a support ring enclosing a thermal barrier between the inner surface and the outer surface.

13. The spool flange adapter of claim 12 wherein the interior surface is a beveled surface.

14. The spool flange adapter of claim 13 wherein the beveled surface has an angle in the range of 30° to 60° relative to the vertical axis of the central bore of the inner housing.

15. The spool adapter flange of claim 14 wherein the beveled surface has an angle of 45° relative to the vertical axis of the central bore of the inner housing.

16. The spool adapter flange of claim 12 wherein the thermal barrier of the flange adapter comprises an insulating material.

17. The spool assembly of claim 1 further comprising a conduit passing through the first lateral aperture of the outer housing and terminating at the second lateral aperture of the inner housing.

18. The spool assembly of claim 17 wherein the conduit is attached to the outer housing.

19. The spool assembly of claim 18 wherein the conduit comprises a first end terminating at the second lateral aperture of the inner housing and a second end terminating in a flange element.

20. The spool assembly of claim 1 further comprising a gasket interposed between the spool adapter flange, the first flanged end of the outer housing and the registration flange of the inner housing.

21. The gasket of claim 20 further comprising an outer ring, having an upper surface and a lower surface, an inner ring concentric to the outer ring having an upper surface and a lower surface, and a plurality of cross members attaching the outer ring to the inner ring.

22. The gasket of claim 21 further comprising a sealing material joined to the upper and lower surfaces of the outer ring and the inner ring.

23. A coking vessel comprising the spool assembly of claim 1.

24. The coking vessel of claim 23, wherein the spool adapter flange is joined to the coking vessel.

* * * * *